US012288460B2

(12) United States Patent
Selvakani et al.

(10) Patent No.: US 12,288,460 B2
(45) Date of Patent: Apr. 29, 2025

(54) VERIFYING A FALSE ALARM ON A SMOKE DETECTOR USING AN INTERNAL AIR QUALITY SENSOR

(71) Applicant: Carrier Corporation, Palm Beach Gardens, FL (US)

(72) Inventors: Kanna Selvakani, Hyderabad (IN); Rakesh Annavaram, Hyderabad (IN); Rakesh Kumar Arepalli, Hyderabad (IN); Jagadish Reddy Putta, Hyderabad (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 56 days.

(21) Appl. No.: 18/312,503

(22) Filed: May 4, 2023

(65) Prior Publication Data

US 2023/0360516 A1 Nov. 9, 2023

Related U.S. Application Data

(60) Provisional application No. 63/339,113, filed on May 6, 2022.

(51) Int. Cl.
*G08B 29/18* (2006.01)
*G08B 17/117* (2006.01)

(52) U.S. Cl.
CPC .......... *G08B 29/185* (2013.01); *G08B 17/117* (2013.01)

(58) Field of Classification Search
CPC .. G08B 29/185; G08B 17/117; G08B 29/183; G08B 29/188; G08B 21/12; G08B 17/10
See application file for complete search history.

(56) References Cited

U.S. PATENT DOCUMENTS

| | | | | |
|---|---|---|---|---|
| 5,691,703 | A * | 11/1997 | Roby | G08B 29/183 340/630 |
| 7,142,105 | B2 | 11/2006 | Chen | |
| 9,007,225 | B2 | 4/2015 | Kates | |
| 10,388,146 | B2 | 8/2019 | Piccolo, III | |
| 2015/0077737 | A1 | 3/2015 | Belinsky et al. | |
| 2015/0170489 | A1 | 6/2015 | Mittleman et al. | |
| 2015/0187194 | A1* | 7/2015 | Hypolite | G08B 17/10 340/628 |

FOREIGN PATENT DOCUMENTS

| | | | |
|---|---|---|---|
| CA | 2685652 | A1 | 5/2010 |
| CN | 106205015 | A | 12/2016 |
| CN | 107504601 | A | 12/2017 |

(Continued)

OTHER PUBLICATIONS

Search Report issued in European Patent Application No. 23171884.2; Application Filing Date May 5, 2023; Date of Mailing Sep. 29, 2023 (11 pages).

*Primary Examiner* — Quan Zhen Wang
*Assistant Examiner* — Rajsheed O Black-Childress
(74) *Attorney, Agent, or Firm* — CANTOR COLBURN LLP

(57) ABSTRACT

A smoke detector system is provided. The smoke detector system includes a smoke detection element. The smoke detector system further includes an internal air quality (IAQ) sensor. The IAQ sensor is disposed and configured to confirm whether an alarm issued by the smoke detection element is real or a false alarm.

15 Claims, 4 Drawing Sheets

(56) References Cited

FOREIGN PATENT DOCUMENTS

| | | | |
|---|---|---|---|
| CN | 107798805 | A | 3/2018 |
| CN | 209607112 | U | 11/2019 |
| CN | 111210588 | A | 5/2020 |
| CN | 210955408 | U | 7/2020 |
| CN | 113570809 | A | 10/2021 |
| DE | 202007012727 | U1 | 11/2007 |
| EP | 3889930 | A1 | 10/2021 |
| KR | 102095986 | B1 | 4/2020 |
| KR | 20210079069 | A | 6/2021 |
| KR | 20210135803 | A | 11/2021 |
| WO | 2017162403 | A1 | 9/2017 |

* cited by examiner

VERIFYING A FALSE ALARM ON A SMOKE DETECTOR USING AN INTERNAL AIR QUALITY SENSOR

CROSS-REFERENCE TO RELATED APPLICATIONS

This application claims the benefit of U.S. Provisional Application No. 63/339,113 filed May 6, 2022, the disclosure of which is incorporated herein by reference in its entirety.

BACKGROUND

The following description relates to false alarm verification and, more specifically, to a system and method of verifying a false alarm on a smoke detector using an internal air quality (IAQ) sensor.

Smoke detection can lead to false alarms for various reasons. These include, but are not limited to, faulty equipment, human error, low batteries or an inconsistent power source, unlocked or loose doors and windows, incorrect installation and/or the presence of pets, rodents or insects.

Currently, a user of a smoke detector has to manually check for smoke/fire presence when a smoke detector generates an alarm to verify that there is not a false alarm in effect. In some cases, however, a user will call the fire department directly without verifying the fire presence or false alarm which will unintentionally waste time and resources of the fire department.

BRIEF DESCRIPTION

According to an aspect of the disclosure, a smoke detector system is provided and includes a smoke detection element and an internal air quality (IAQ) sensor disposed and configured to confirm whether an alarm issued by the smoke detection element is real or a false alarm.

In accordance with additional or alternative embodiments, each of the smoke detection element and the IAQ sensor is a standalone device.

In accordance with additional or alternative embodiments, the IAQ sensor includes one or more of a PM2.5 sensor, a PM10 sensor, a fire detecting odor sensor, and a total volatile organic compounds (TVOC) sensor and further includes a $CO/CO_2$ gas sensor, a temperature sensor and a humidity sensor.

In accordance with additional or alternative embodiments, the smoke detection element and the IAQ sensor are integrated into a single device.

In accordance with additional or alternative embodiments, the IAQ sensor of the single device includes one or more of a PM2.5 sensor, a PM10 sensor, a fire detecting odor sensor, and a total volatile organic compounds (TVOC) sensor and further includes a $CO/CO_2$ gas sensor, a temperature sensor and a humidity sensor.

In accordance with additional or alternative embodiments, when the smoke detection element issues the alarm, a ramping up of the IAQ sensor is indicative of the alarm being real and a normal response of the IAQ sensor is indicative of the alarm being a false alarm.

According to an aspect of the disclosure, a smoke detector system is provided and includes a smoke detection element, an internal air quality (IAQ) sensor and a network with which the smoke detection element, the IAQ sensor and at least one other connected device are intercommunicative. The IAQ sensor is disposed and configured to confirm whether an alarm issued by the smoke detection element is real or a false alarm.

In accordance with additional or alternative embodiments, a thermostat is intercommunicative with the smoke detection element, the IAQ sensor and the at least one other connected device.

In accordance with additional or alternative embodiments, the at least one other connected device is a portable computing device of a user.

In accordance with additional or alternative embodiments, the portable computing device is a smartphone.

In accordance with additional or alternative embodiments, each of the smoke detection element and the IAQ sensor is a standalone device.

In accordance with additional or alternative embodiments, the IAQ sensor includes one or more of a PM2.5 sensor, a PM10 sensor, a fire detecting odor sensor, and a total volatile organic compounds (TVOC) sensor and further includes a $CO/CO_2$ gas, a temperature sensor and a humidity sensor.

In accordance with additional or alternative embodiments, the smoke detection element and the IAQ sensor are integrated into a single device.

In accordance with additional or alternative embodiments, the IAQ sensor of the single device includes one or more of a PM2.5 sensor, a PM10 sensor, a fire detecting odor sensor and a total volatile organic compounds (TVOC) sensor and further includes a $CO/CO_2$ gas sensor, a temperature sensor and a humidity sensor.

In accordance with additional or alternative embodiments, when the smoke detection element issues the alarm, a ramping up of the IAQ sensor is indicative of the alarm being real and a normal response of the IAQ sensor is indicative of the alarm being a false alarm.

According to an aspect of the disclosure, a method of operating a smoke detector system is provided and includes recognizing that a smoke detection element issues an alarm, determining a state of an internal air quality (IAQ) sensor and judging whether the alarm is real or a false alarm based on a result of the determining.

In accordance with additional or alternative embodiments, each of the smoke detection element and the IAQ sensor is a standalone device and the IAQ sensor includes one or more of a PM2.5 sensor, a PM10 sensor, a fire detecting odor sensor, a total volatile organic compounds (TVOC) sensor and further includes a $CO/CO_2$ gas sensor, a temperature sensor and a humidity sensor.

In accordance with additional or alternative embodiments, the smoke detection element and the IAQ sensor are integrated into a single device and the IAQ sensor of the single device includes one or more of a PM2.5 sensor, a PM10 sensor, a fire detecting odor sensor, a total volatile organic compounds (TVOC) sensor and further includes a $CO/CO_2$ gas sensor, a temperature sensor and a humidity sensor.

In accordance with additional or alternative embodiments, the determining of the state of the IAQ sensor includes finding that the IAQ sensor is ramping up and the judging includes judging that the alarm is real based on the IAQ sensor ramping up.

In accordance with additional or alternative embodiments, the determining of the state of the IAQ sensor includes finding that the IAQ sensor is responding normally and the judging includes judging that the alarm is the false alarm based on the IAQ sensor responding normally.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

As will be described below, systems and methods are provided that using an IAQ sensor with reference to time along with a smoke detector to automatically validate the presence of smoke without manual intervention during an alarm to provide additional indications to the user and/or the fire department as to whether the alarm is a false alarm.

Figure 1:
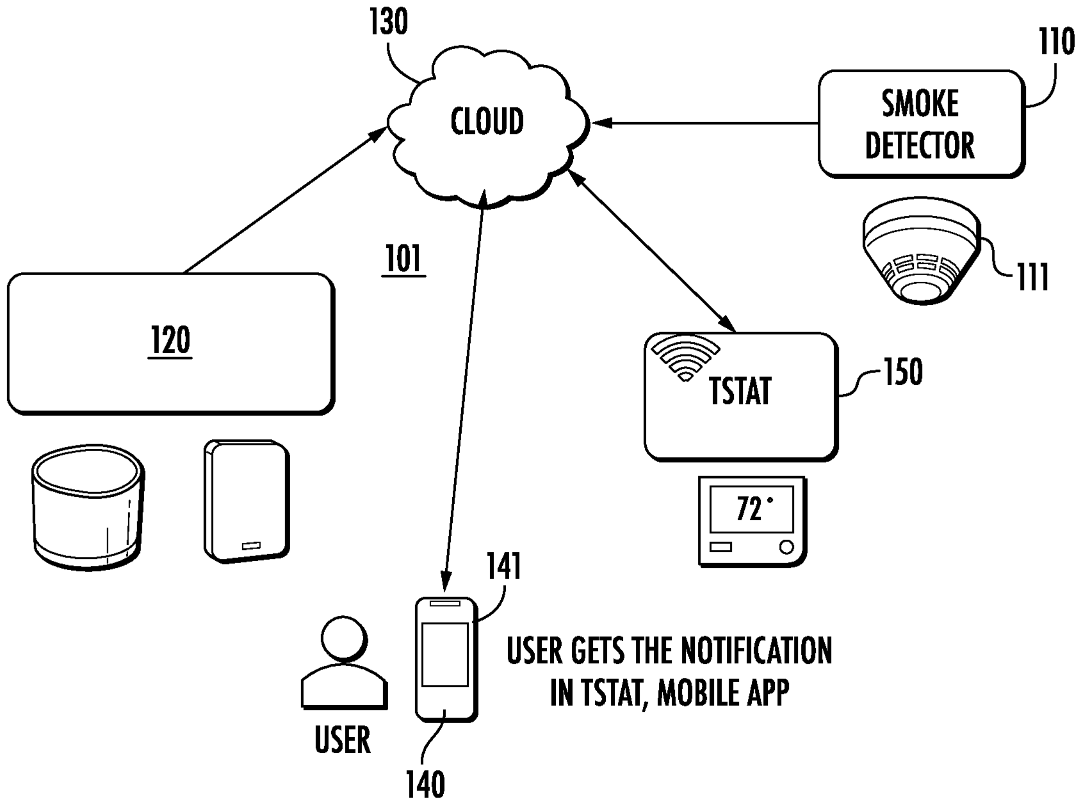
FIG. 1 is a schematic diagram of a smoke detector system in accordance with exemplary embodiments.
Figure 2:
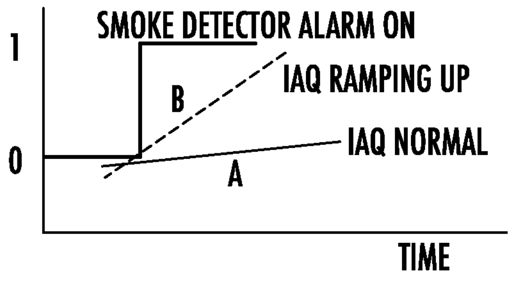
FIG. 2 is a graphical depiction of an operation of the smoke detector system of FIG. 1 in accordance with exemplary embodiments.

With reference to FIGS. 1 and 2, a smoke detector system 101 is provided and includes a smoke detection element 110, an IAQ sensor 120 and a network 130, such as a cloud network, with which the smoke detection element 110, the IAQ sensor 120 and at least one other connected device 140 are intercommunicative with the network 130 and with each other. The smoke detection element 110 can be a smoke detector 111. The smoke detection system 101 can further include a thermostat 150, which is intercommunicative with the network 130 and with the smoke detection element 110, the IAQ sensor 120 and the at least one other connected device 140. The at least one other connected device 140 can be is a portable computing device of a user and/or a fire department official, such as a smartphone 141.

The IAQ sensor 120 is disposed and configured to confirm whether an alarm issued by the smoke detection element 110 is real or a false alarm. That is, as shown in FIG. 2, when the smoke detection element 110 issues the alarm, a ramping up of values of the IAQ sensor 120 can be read (i.e., by an application installed on the smartphone 141) as being indicative of the alarm being real whereas a normal response of the IAQ sensor 120 with no apparent ramping up of values can be indicative of the alarm being a false alarm.

Figure 3:
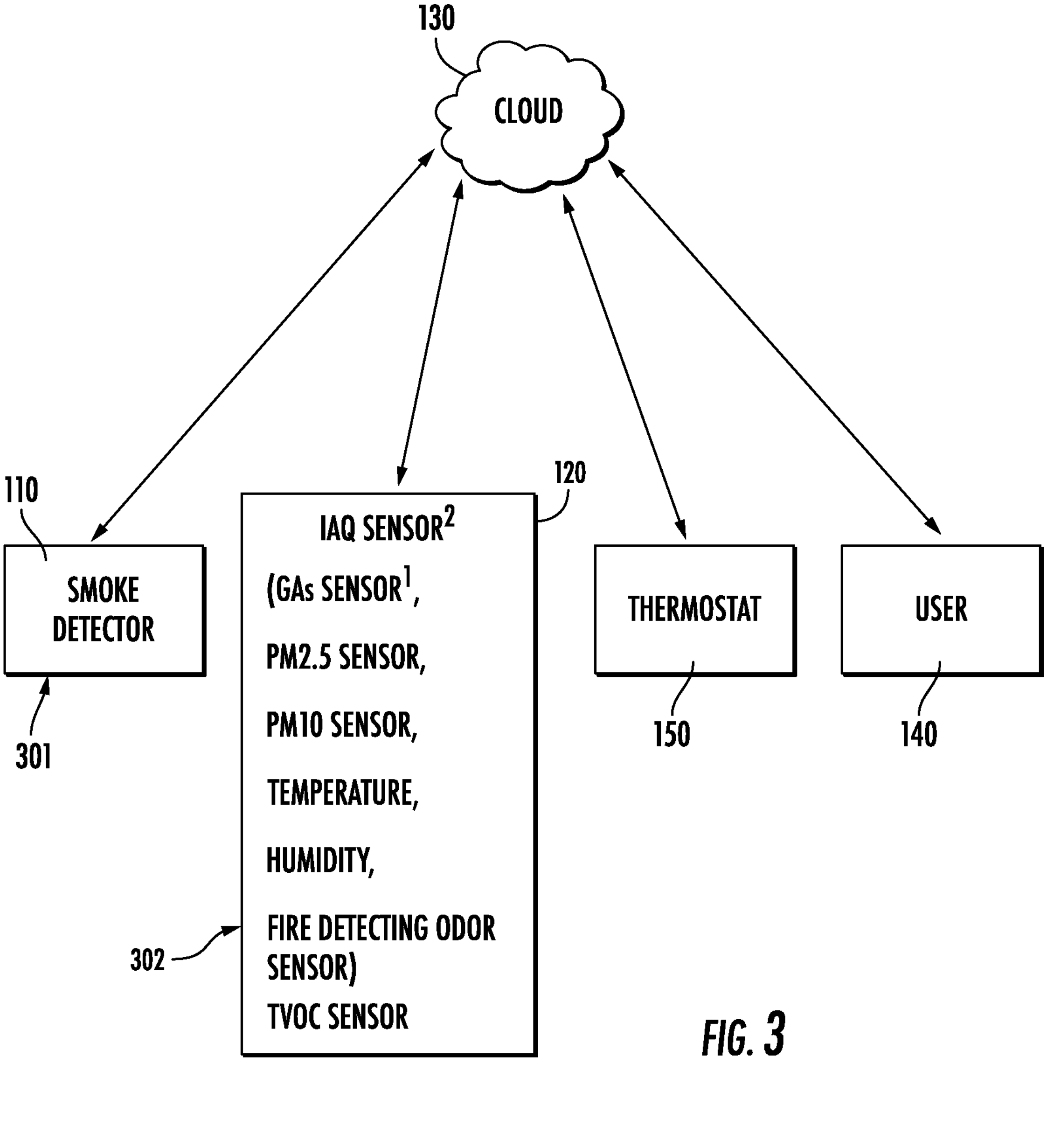
FIG. 3 is a schematic diagram of components of a standalone IAQ sensor of the smoke detector system of FIG. 1 in accordance with exemplary embodiments.

With reference to FIG. 3, each of the smoke detection element 110 and the IAQ sensor 120 can be a separate standalone device (i.e., the standalone smoke detection element 301 and the standalone IAQ sensor 302). In these or other cases, the IAQ sensor 120 can include one or more of a PM2.5 sensor, a PM10 sensor, a fire detecting odor sensor and a total volatile organic compounds (TVOC) sensor. The IAQ sensor 120 can also include one or more of a $CO/CO_2$ gas sensor, a temperature sensor and a humidity sensor.

Figure 4:
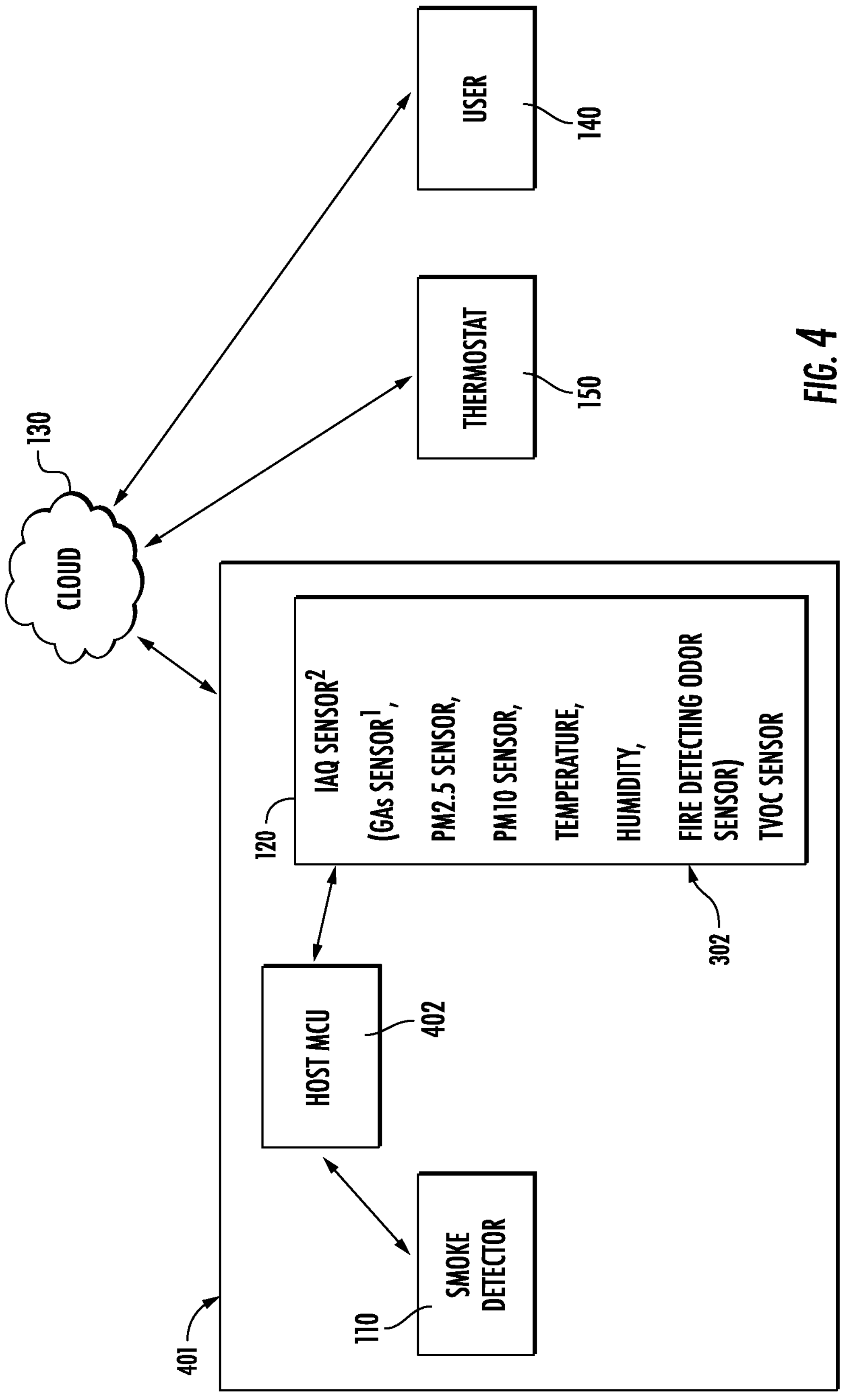
FIG. 4 is a schematic diagram of components of an IAQ sensor of the smoke detector system of FIG. 1 that is integrated with a smoke detection element in accordance with exemplary embodiments.

With reference to FIG. 4, the smoke detection element 110 and the IAQ sensor 120 can be integrated into a single device 401 with a microprocessor, such as a host MCU 402. In these or other cases, the IAQ sensor 120 can include one or more of a PM2.5 sensor, a PM10 sensor, a fire detecting odor sensor and a TVOC sensor. The IAQ sensor 120 can also include one or more of a $CO/CO_2$ gas sensor, a temperature sensor and a humidity sensor.

Figure 5:
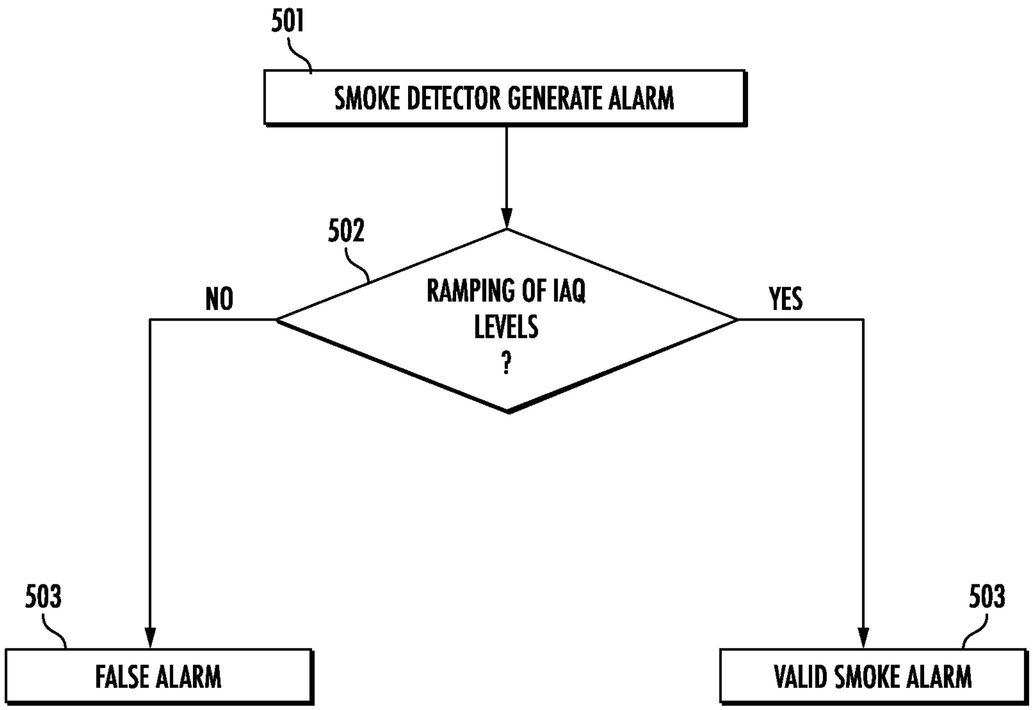
FIG. 5 is a flow diagram illustrating a method of operating a smoke detector system in accordance with exemplary embodiments.

With reference to FIG. 5, a method of operating a smoke detector system is provided and includes recognizing that a smoke detection element as described above issues an alarm (block 501), determining a state of an IAQ sensor as described above (block 502) and judging whether the alarm is real or a false alarm based on a result of the determining (block 503). In accordance with embodiments, the determining of the state of the IAQ sensor of block 502 can include finding that the IAQ sensor is ramping up whereupon the judging of block 503 can include judging that the alarm is real based on the IAQ sensor ramping up. In accordance with alternative embodiments, the determining of the state of the IAQ sensor of block 502 can include finding that the IAQ sensor is responding normally whereupon the judging of block 503 can include judging that the alarm is the false alarm based on the IAQ sensor responding normally.

Technical effects and benefits of the present disclosure are that users and fire departments will be able to make better decisions during an alarm about how to respond to the alarm. This which will save time and resources. The present invention also provides second-level verification on the presence of smoke using IAQ sensors. This can be used for automatic verification of the presence of smoke.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A smoke detector system, comprising:

a portable computing device having an application stored thereon;

a smoke detection element; and an internal air quality (IAQ) sensor disposed and configured to confirm whether an alarm issued by the smoke detection element is real or a false alarm, wherein, when the smoke detection element issues the alarm:

a ramping up of values of the IAQ sensor is indicative of the alarm being real and is graphed with a first slope, which is read by the application as being indicative of the alarm being real, and a normal response of the IAQ sensor with no ramping up of the values of the IAQ sensor is indicative of the alarm being a false alarm and is graphed with a second slope, which differs from the first slope and which is read by the application as being indicative of the alarm being false.

2. The smoke detector system according to claim 1, wherein each of the smoke detection element and the IAQ sensor is a standalone device.

3. The smoke detector system according to claim 2, wherein the IAQ sensor comprises a PM2.5 sensor, a PM10 sensor, a fire detecting odor sensor, and a total volatile organic compounds (TVOC) sensor and further comprises a $CO/CO_2$ gas sensor, a temperature sensor and a humidity sensor.

4. The smoke detector system according to claim 1, wherein the smoke detection element and the IAQ sensor are integrated into a single device.

5. The smoke detector system according to claim 4, wherein the IAQ sensor of the single device comprises a PM2.5 sensor, a PM10 sensor, a fire detecting odor sensor, and a total volatile organic compounds (TVOC) sensor and further comprises a $CO/CO_2$ gas sensor, a temperature sensor and a humidity sensor.

6. A smoke detector system, comprising:

a smoke detection element;

an internal air quality (IAQ) sensor; and a network with which the smoke detection element, the IAQ sensor and portable computing device are inter-communicative, the IAQ sensor being disposed and configured to confirm whether an alarm issued by the smoke detection element is real or a false alarm, wherein the application has an application stored thereon and, when the smoke detection element issues the alarm:

a ramping up of values of the IAQ sensor is indicative of the alarm being real and is graphed with a first slope, which is read by the application as being indicative of the alarm being real, and a normal response of the IAQ sensor with no ramping up of the values of the IAQ sensor is indicative of the alarm being a false alarm and is graphed with a second slope, which differs from the first slope and which is read by the application as being indicative of the alarm being false.

7. The smoke detector system according to claim 6, further comprising a thermostat which is intercommunicative with the smoke detection element, the IAQ sensor and the at least one other connected device.

8. The smoke detector system according to claim 6, wherein the portable computing device is a smartphone.

9. The smoke detector system according to claim 6, wherein each of the smoke detection element and the IAQ sensor is a standalone device.

10. The smoke detector system according to claim 9, wherein the IAQ sensor comprises a PM2.5 sensor, a PM10 sensor, a fire detecting odor sensor, and a total volatile organic compounds (TVOC) sensor and further comprises a $CO/CO_2$ gas sensor, a temperature sensor and a humidity sensor.

11. The smoke detector system according to claim 6, wherein the smoke detection element and the IAQ sensor are integrated into a single device.

12. The smoke detector system according to claim 11, wherein the IAQ sensor of the single device comprises of a PM2.5 sensor, a PM10 sensor, a fire detecting odor sensor, and a total volatile organic compounds (TVOC) sensor and further comprises a $CO/CO_2$ gas sensor, a temperature sensor and a humidity sensor.

13. A method of operating a smoke detector system, the method comprising:

storing an application on a portable computing device;

recognizing that a smoke detection element issues an alarm;

determining a state of an internal air quality (IAQ) sensor; and judging whether the alarm is real or a false alarm based on a result of the determining, wherein:

the determining of the state of the IAQ sensor comprises finding that the IAQ sensor is ramping up in values that is graphed with a first slope, which is read by the application, and the judging comprises judging that the alarm is real based on the application reading the IAQ sensor ramping up, and the determining of the state of the IAQ sensor comprises finding that the IAQ sensor is responding normally with no ramping up of the values of the IAQ sensor that is graphed with a second slope, which differs from the first slope and which is read by the application, and the judging comprises judging that the alarm is the false alarm based on the application reading the IAQ sensor responding normally.

14. The method according to claim 13, wherein:

each of the smoke detection element and the IAQ sensor is a standalone device, and the IAQ sensor comprises of a PM2.5 sensor, a PM10 sensor, a fire detecting odor sensor and a total volatile organic compounds (TVOC) sensor and further comprises a $CO/CO_2$ gas sensor, a temperature sensor and a humidity sensor.

15. The method according to claim 13, wherein:

the smoke detection element and the IAQ sensor are integrated into a single device, and the IAQ sensor of the single device comprises a PM2.5 sensor, a PM10 sensor, a fire detecting odor sensor, and a total volatile organic compounds (TVOC) sensor and further comprises a $CO/CO_2$ gas sensor, a temperature sensor and a humidity sensor.

* * * * *